(12) United States Patent
Schnaidt et al.

(10) Patent No.: US 11,654,742 B2
(45) Date of Patent: May 23, 2023

(54) UNIQUE AIRFLOW DELIVERY PATH FOR INDEPENDENT REAR ZONE IN TRI OR QUAD HVAC SYSTEM

(71) Applicant: Hanon Systems, Daejeon (KR)

(72) Inventors: Wayne Schnaidt, Novi, MI (US); Jayanthi R. Iyer, Northville, MI (US); Eric Haupt, Livonia, MI (US); Dennis Vermette, Westland, MI (US)

(73) Assignee: HANON SYSTEMS, Daejeon (KR)

( * ) Notice: Subject to any disclaimer, the term of this patent is extended or adjusted under 35 U.S.C. 154(b) by 367 days.

(21) Appl. No.: 16/916,261

(22) Filed: Jun. 30, 2020

(65) Prior Publication Data

US 2021/0001682 A1    Jan. 7, 2021

Related U.S. Application Data

(60) Provisional application No. 62/870,883, filed on Jul. 5, 2019.

(51) Int. Cl.
*B60H 1/00* (2006.01)

(52) U.S. Cl.
CPC ..... *B60H 1/00064* (2013.01); *B60H 1/00207* (2013.01); *B60H 1/00514* (2013.01); *B60H 1/00564* (2013.01); *B60H 1/00871* (2013.01); *B60H 2001/002* (2013.01); *B60H 2001/00092* (2013.01); *B60H 2001/00242* (2013.01)

(58) Field of Classification Search
CPC ........... B60H 1/00064; B60H 1/00207; B60H 1/00514; B60H 1/00564; B60H 1/00871; B60H 2001/00092; B60H 2001/002; B60H 2001/00242; B60H 1/0005

See application file for complete search history.

(56) References Cited

U.S. PATENT DOCUMENTS

| | | | |
|---|---|---|---|
| 2003/0066299 A1* | 4/2003 | Aoki | B60H 1/00864 236/91 C |
| 2008/0223549 A1 | 9/2008 | Schlachter | |

(Continued)

FOREIGN PATENT DOCUMENTS

| | | |
|---|---|---|
| DE | 10227349 A1 | 1/2004 |
| DE | 102009010542 A1 | 9/2009 |

(Continued)

*Primary Examiner* — David J Teitelbaum
(74) *Attorney, Agent, or Firm* — Shumaker, Loop & Kendrick, LLP; James D. Miller

(57) ABSTRACT

An air-handling system includes an evaporator core and a downstream arranged heater core disposed in an air-handling casing. A primary flow path is formed within the air-handling casing and leads to a primary zone of a passenger compartment. The primary flow path is divided into a primary cool air pathway bypassing the heater core and a primary warm air pathway passing through the heater core. A secondary flow path is formed within the air-handling casing and leads to a secondary zone of the passenger compartment. The secondary flow path includes a secondary cool air pathway branching from the primary flow path downstream of the evaporator core and a secondary warm air pathway branching from the primary flow path downstream of the heater core. The secondary cool air pathway bypasses the heater core and the secondary warm air pathway passes through the heater core.

17 Claims, 7 Drawing Sheets

(56) References Cited

U.S. PATENT DOCUMENTS

| | | | |
|---|---|---|---|
| 2009/0117841 A1* | 5/2009 | Goto | B60H 1/00064 454/127 |
| 2009/0215379 A1* | 8/2009 | Matsunoo | B60H 1/0005 454/160 |
| 2018/0105011 A1* | 4/2018 | Park | B60H 1/00514 |
| 2018/0141404 A1 | 5/2018 | Yeon | |

FOREIGN PATENT DOCUMENTS

| | | |
|---|---|---|
| KR | 2012013892 A | 12/2012 |
| KR | 20120138928 A | 12/2012 |
| KR | 101319050 B1 | 10/2013 |

* cited by examiner

UNIQUE AIRFLOW DELIVERY PATH FOR INDEPENDENT REAR ZONE IN TRI OR QUAD HVAC SYSTEM

CROSS-REFERENCE TO THE RELATED APPLICATION

This patent application claims priority to U.S. Provisional Patent Application Ser. No. 62/870,883, filed on Jul. 5, 2019, the entire disclosure of which is hereby incorporated herein by reference.

FIELD OF THE INVENTION

The invention relates generally to a heating, ventilating, and air conditioning (HVAC) air-handling system for a motor vehicle, and more particularly, to an HVAC air-handling system for providing independent climate control to multiple different zones of a passenger compartment of the motor vehicle.

BACKGROUND

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The air-handling system conditions air flowing therethrough and distributes the conditioned air throughout the passenger compartment.

The air-handling system commonly employs a housing having a plurality of conduits and doors for selectively controlling a flow of air to various vents within the passenger compartment of the vehicle, depending on an operating mode selected by a vehicle occupant. Each operating mode includes a preselected percentage of the air originating from a mixing chamber delivered to each of the corresponding vents associated with the selected operating mode. The vents may include panel vents, console vents, front floor vents, rear floor vents, windshield defrost vents, and side window defrost vents, for example.

It has become increasingly common for such air-handling systems to provide a feature wherein the passengers of the motor vehicle can select different temperature settings with respect to two or more different zones within the passenger compartment of the vehicle. For example, many vehicles include independent temperature control for the left and right sides of the passenger compartment, for the front and rear seat zones of the passenger compartment, or for combinations thereof, as desired.

However, the independent temperature control provided to the different zones of the passenger compartment presents many challenges. Specifically, the air-handling system must control the temperature of the air passing therethrough with respect to each of the different zones of the passenger controller without requiring additional and independently provided heating or cooling devices within each of the independently provided flow paths leading to each of the different zones. The different paths must accordingly be integrated directly into the structure of the corresponding air-handling system.

Many air-handling systems that provide independent control of the flow to an additional zone such as the rear seat zone of the passenger compartment include an enlarged packaging size. The enlarged packaging size may include the introduction of an independent flow path for the cold air to be delivered to the additional zone after having passed through an evaporator core of the air-handling system. The inclusion of the independent flow path for the cold air may include the expansion and division of a bottommost portion of the air-handling system below a heater core used to heat the air delivered to each zone of the passenger compartment. The implementation of the additional cold air flow path accordingly increases the packaging size of the air-handling system in a vertical direction thereof that may undesirably limit the possible configurations of the adjacent components within the associated vehicle.

Accordingly, there exists a need in the art for an HVAC air-handling system with a reduced packaging size configured to provide independent temperature control to multiple zones of the passenger compartment of the associated vehicle.

SUMMARY OF THE INVENTION

In accordance and attuned with the present invention, an air-handling system having a primary airflow delivery path for delivering conditioned air to a primary zone of a passenger compartment of a vehicle as well as a unique secondary airflow delivery path for delivering air to a secondary zone of the passenger compartment has surprisingly been discovered.

According to an embodiment of the present invention, an air-handling system for a vehicle comprises an evaporator core disposed in an air-handling casing configured to receive a flow of air therethrough. A heater core is disposed in the air-handling casing at a position downstream of the evaporator core with respect to the flow of the air. A primary flow path is formed within the air-handling casing and leads to a primary zone of a passenger compartment of the vehicle. The primary flow path is divided into a primary cool air pathway receiving air bypassing the heater core and a primary warm air pathway receiving air passing through the heater core. A secondary flow path is formed within the air-handling casing and leads to a secondary zone of the passenger compartment. The secondary flow path includes a secondary cool air pathway branching from the primary flow path downstream of the evaporator core and a secondary warm air pathway branching from the primary flow path downstream of the heater core. The secondary cool air pathway receives air bypassing the heater core and the secondary warm air pathway receives air passing through the heater core.

According to another embodiment of the invention, an air-handling system for a vehicle comprises an evaporator core disposed in an air-handling casing configured to receive a flow of air therethrough. A heater core is disposed in the air-handling casing at a position downstream of the evaporator core with respect to the flow of the air. A primary flow path and a secondary flow path are each formed within the air-handling casing. The primary flow path leads to a primary zone of a passenger compartment of the vehicle and the secondary flow path leads to a secondary zone of the passenger compartment of the vehicle. The primary flow path is divided into first primary flow path and a second primary flow path downstream of the evaporator core. The first primary flow path is divided into a first primary cool air pathway receiving air bypassing the heater core and a first primary warm air pathway receiving air passing through the heater core. The second primary flow path is divided into a second primary cool air pathway receiving air bypassing the heater core and a second primary warm air pathway receiving air passing through the heater core. The secondary flow path includes a secondary cool air pathway branching from the primary flow path downstream of the evaporator core and a secondary warm air pathway branching from the primary flow path downstream of the heater core. The secondary cool air pathway receives air bypassing the heater core and the secondary warm air pathway receives air passing through the heater core.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 4A-4C are fragmentary enlarged cross-sectional views of the secondary flow path through the air handling system taken from the same perspective as FIG. 2, wherein FIG. 4A shows a blockage of air through a cool air pathway of the secondary flow path, FIG. 4B shows flow through each of the cool air pathway and a warm air pathway of the secondary flow path, and FIG. 4C shows a blockage of air through the warm air pathway;

DETAILED DESCRIPTION OF THE INVENTION

Figure 1:
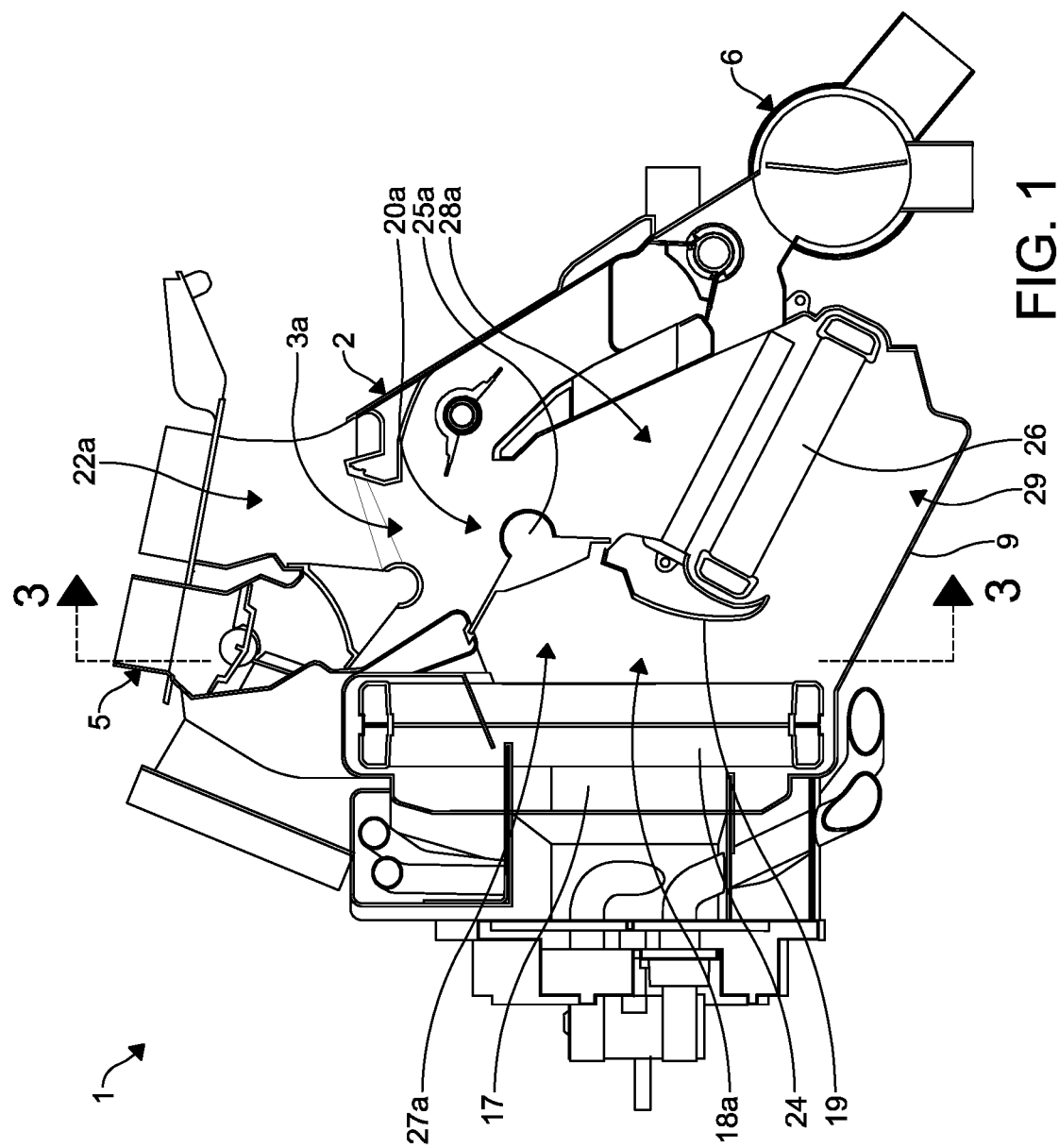
FIG. 1 is a cross-sectional elevational view of an air-handling system according to an embodiment of the present invention as shown from the perspective of section lines 1-1 in FIG. 3, wherein a primary flow path through the air-handling system is shown.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a similar fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, zones, and/or sections, these elements, components, regions, zones, and/or sections should not be limited by these terms. These terms may be only used to distinguish one element, component, region, zone, or section from another element, component, region, zone, or section. Terms such as "first," "second," and other numerical terms when used herein do not imply a sequence or order unless clearly indicated by the context. Thus, a first element, component, region, zone, or section discussed below could be termed a second element, component, region, zone, or section without departing from the teachings of the example embodiments.

FIGS. 1-6 illustrate an air-handling system 1 of a heating, ventilating, and air conditioning (HVAC) system or climate control system for a vehicle (not shown) according to an embodiment of the present disclosure. The air-handling system 1 typically provides heating, ventilation, and air conditioning for a passenger compartment (not shown) of the vehicle. The passenger compartment may be divided into a plurality of different zones, such as a front seat zone and a rear seat zone. The air directed to the front seat zone may be directed through various different vents, including windshield or side window defrost vents, panel vents, or floor vents. The air directed to the rear seat zone may also be directed through various different vents, including panel vents and floor vents. The front seat zone and the rear seat zone may each be further subdivided into left and right zones (driver side and passenger side zones), as desired.

The air-handling system 1 may accordingly be configured to provide for independent flow and temperature control of the air with respect to at least two different zones of the passenger compartment. Specifically, the air-handling system 1 may be configured to provide at least one of dual zone control, tri-zone control, or quad-zone control. The dual zone control may include independent control of the air directed to each of the front seat zone and the rear seat zone, as desired. The tri-zone control may include the division of the front seat zone into driver side and passenger side zones to allow for independent control of the air directed to each of the front seat driver side zone, the front seat passenger side zone, and the rear seat zone. The quad-zone control may further include the division of the rear seat zone into driver side and passenger side zones to allow for independent control of the air directed to each of the front seat driver side zone, the front seat passenger side zone, the rear seat driver side zone, and the rear seat passenger side zone.

The air-handling system 1 includes an air-handling casing 2 defining a primary flow path 3 and a secondary flow path 4 of the air-handling system 1. The primary flow path 3 refers to a flow path through the air-handling casing 2 leading to a primary zone of the vehicle, wherein the primary zone generally refers to the aforementioned front seat zone of the passenger compartment having the defrost vents, panel vents, and floor vents typically responsible for maintaining the safety and comfort of the driver and the front passenger of the vehicle. The secondary flow path 4 generally refers to a flow path through the air-handling casing 2 branching from select portions of the primary flow path 3 and leading to a secondary and distinct zone of the passenger compartment such as the aforementioned rear seat zone of the passenger compartment. However, the primary zone and the secondary zone may each refer to any zone of the vehicle, as desired, without departing from the scope of the present invention.

Figure 2:
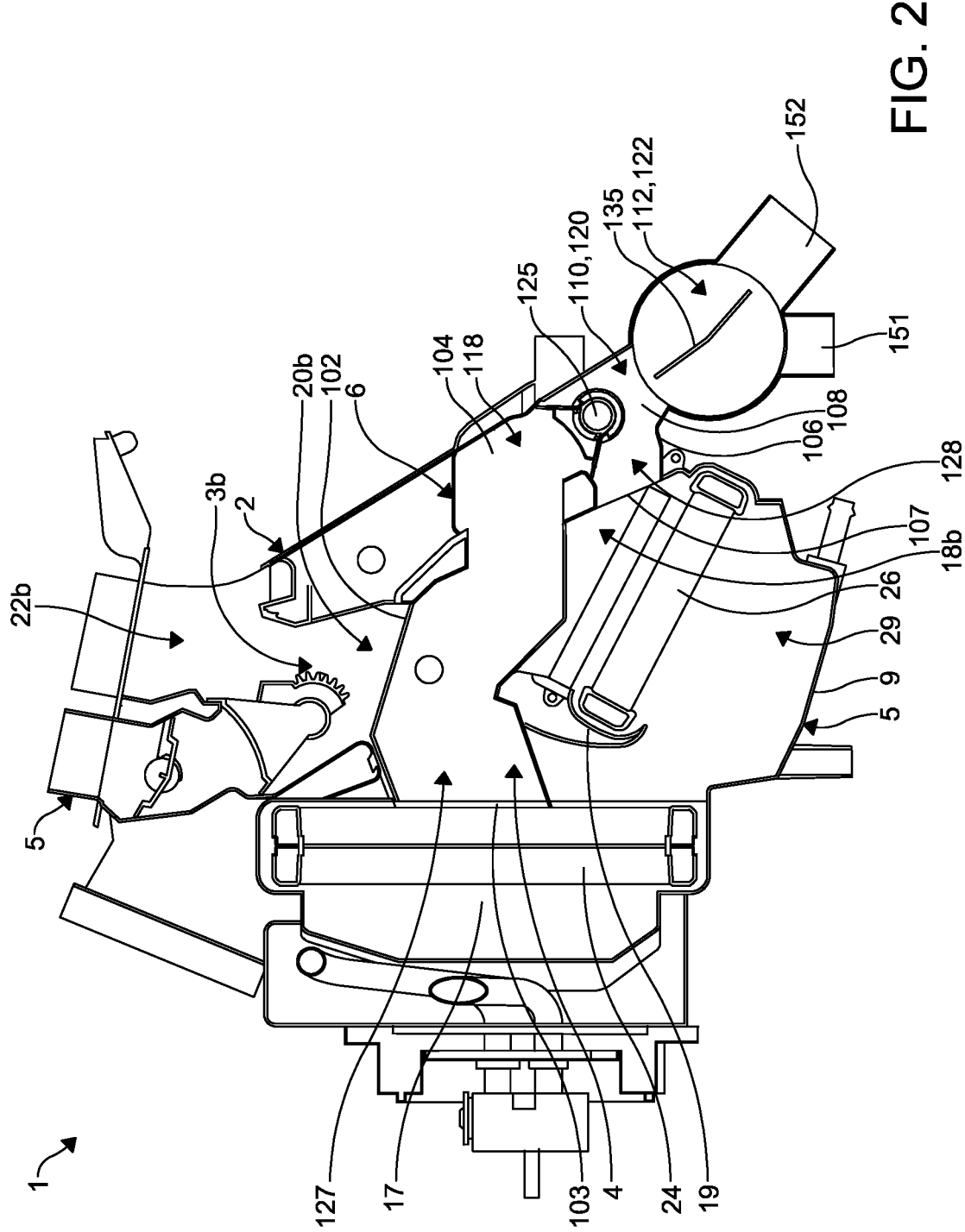
FIG. 2 is a cross-sectional elevational view of the air-handling system as shown from the perspective of section lines 2-2 in FIG. 3, wherein each of a primary flow path and a secondary flow path through the air-handling system are shown.
Figure 3:
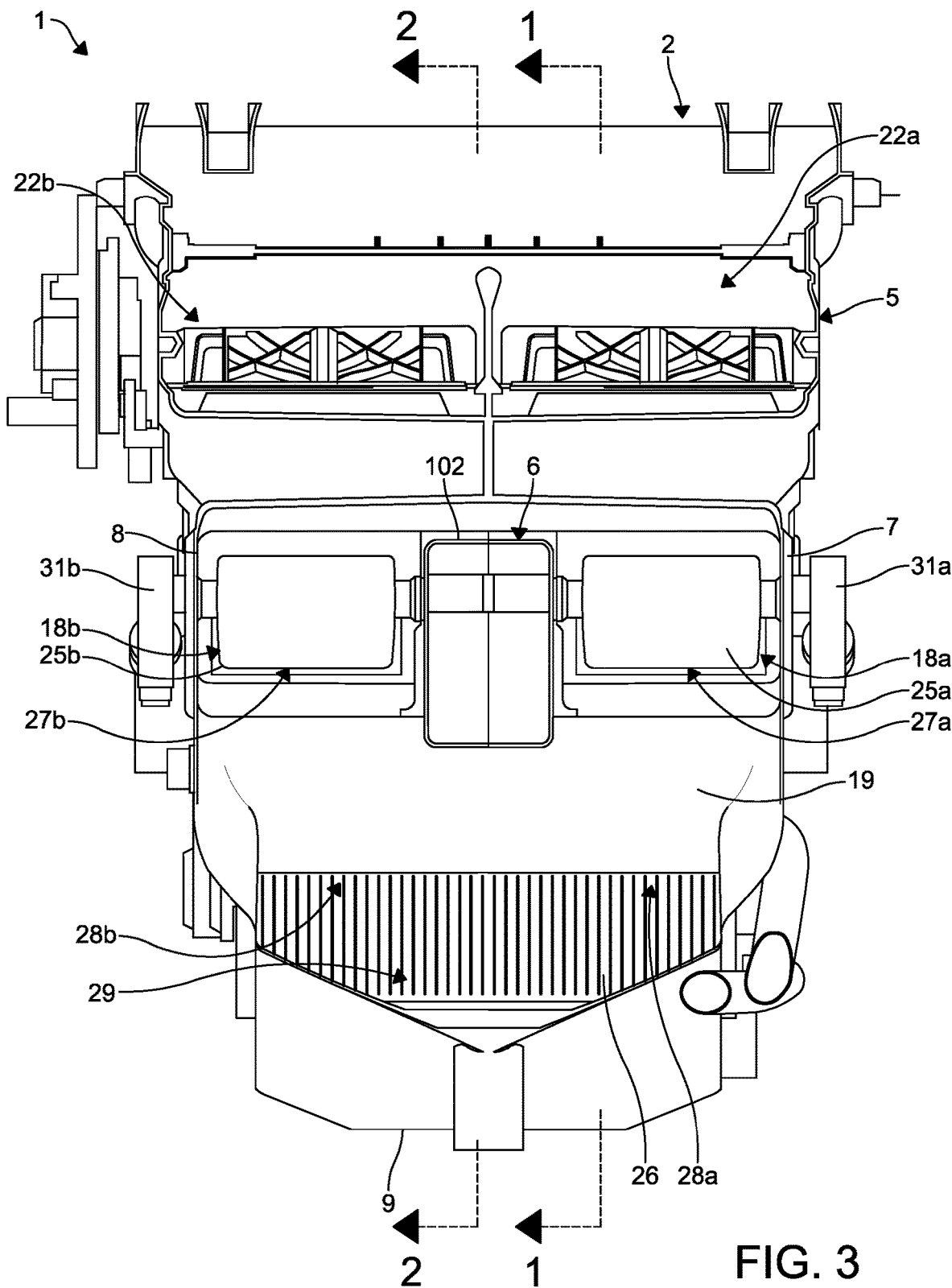
FIG. 3 is a cross-sectional elevational view of the air-handling system as taken from the perspective of section lines 3-3 in FIG. 1.

The air-handling casing 2 as illustrated in the present embodiment of the invention includes a primary zone housing 5 and a secondary zone housing 6. As best shown in FIG. 3, the primary zone housing 5 includes a first lateral sidewall 7 and an opposing second lateral sidewall 8 of the air-handling casing 2, wherein the first lateral sidewall 7 and the second lateral sidewall 8 are spaced from each other with respect to a lateral direction of the air-handling casing 2. The lateral direction of the air-handling casing 2 is generally perpendicular to a direction of flow of the air through the air-handling casing 2. The primary zone housing 5 further includes a peripheral wall 9 connecting the first lateral sidewall 7 to the second lateral sidewall 8 with respect to the lateral direction of the air-handling casing 2. The peripheral wall 9 connects the opposing lateral sidewalls 7, 8 about a majority of the periphery of each of the lateral sidewalls 7, 8 with the exception of a rearward portion of the air-handling casing 2 that is occupied by a rearward portion of the secondary zone housing 6, as best shown in FIGS. 1 and 2. The primary zone housing 5 may be formed from the cooperation of two or more housing shells coupled to each other to form the lateral sidewalls 7, 8 and the peripheral sidewall 9. In some embodiments, the housing shells may be laterally divided such that the peripheral sidewall 9 is divided in the lateral direction of the air-handling casing 2 to meet at a seam disposed intermediate the lateral sidewalls 7, 8 and arranged perpendicular to the lateral direction of the air-handling casing 2. In other embodiments, each of the housing shells may include portions of each of the lateral sidewalls 7, 8 as well as a portion of the peripheral sidewall 9 with the corresponding seam arranged parallel to the lateral direction of the air-handling casing 2. For example, such a seam may be substantially horizontal from the perspective of FIGS. 1 and 2. However, any configuration or number of housing shells may be provided to form the primary zone housing 5 relative to the secondary zone housing 6 without necessarily departing from the scope of the present invention.

As best shown in FIG. 3, the secondary zone housing 6 is received within the primary zone housing 5 at a position intermediate the first and second lateral sidewalls 7, 8 thereof with respect to the lateral direction of the air-handling casing 2. The secondary zone housing 6 includes a width in the lateral direction of the air-handling casing 2 that is less than the distance between the opposing lateral sidewalls 7, 8 to form open spaces within the primary zone housing 5 to either side of the secondary zone housing 6. As mentioned above, the secondary zone housing 6 also defines a rearward portion of the air-handling casing 2 and extends outside of an opening formed in a rearward surface of the primary zone housing 5. The secondary zone housing 6 may be received horizontally into the opening during assembly of the air-handling casing 2 (right-to-left from the perspective of FIGS. 1 and 2). Alternatively, the housing shells forming the primary zone housing 5 may be assembled around the secondary zone housing 6 with the housing shells approaching the secondary zone housing 6 in the lateral direction of the air-handling casing 2. The primary zone housing 5 may be assembled to at least partially enclose and surround the secondary zone housing 6 using any assembly process or configuration without necessarily departing from the scope of the present invention, so long as the relationships described herein for independently controlling the flow of air to each of the different zones of the passenger compartment are maintained.

Figure 5:
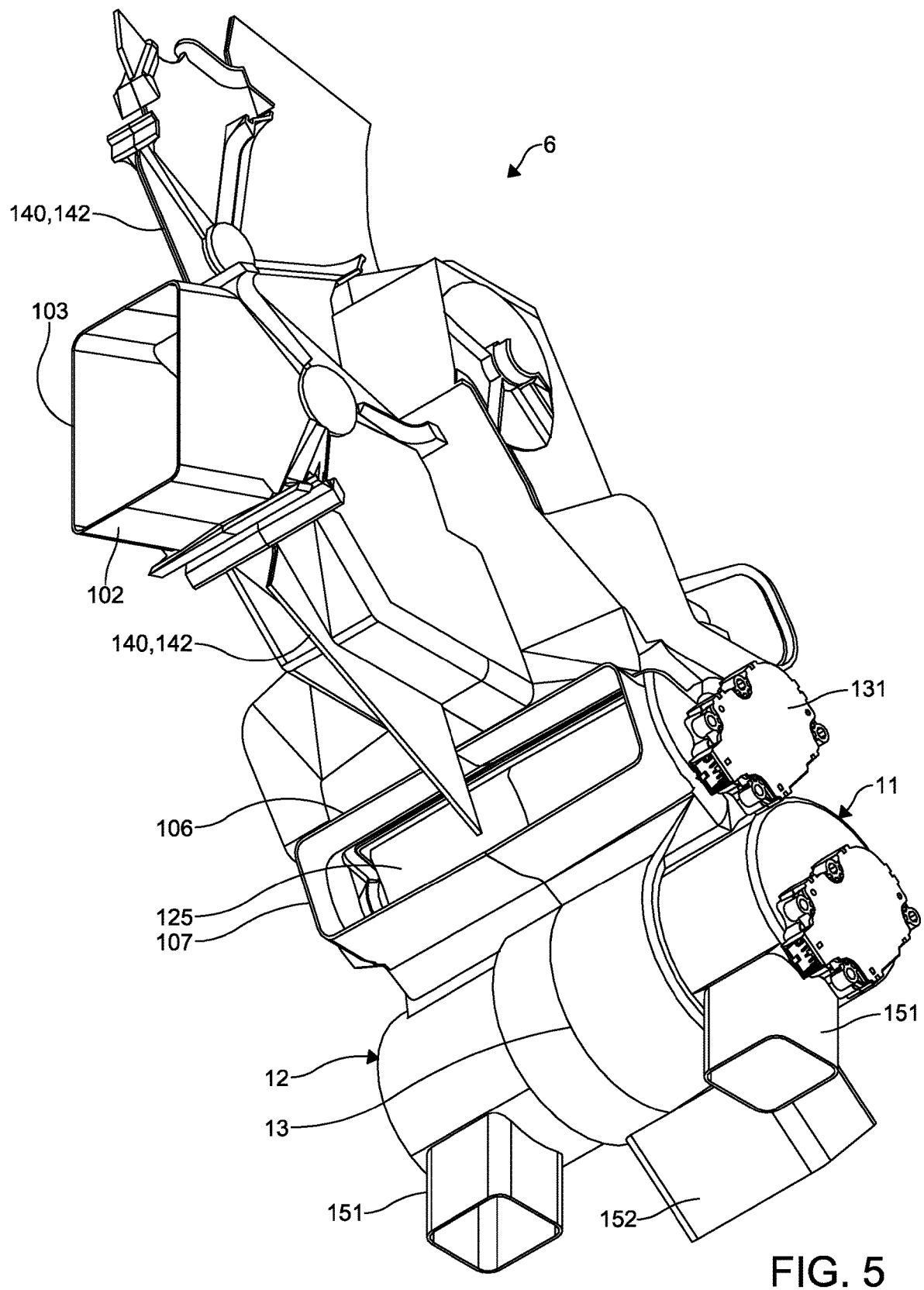
FIG. 5 is a front perspective view of a casing module defining the secondary flow path of the air-handling system of FIG. 1 in isolation.
Figure 6:
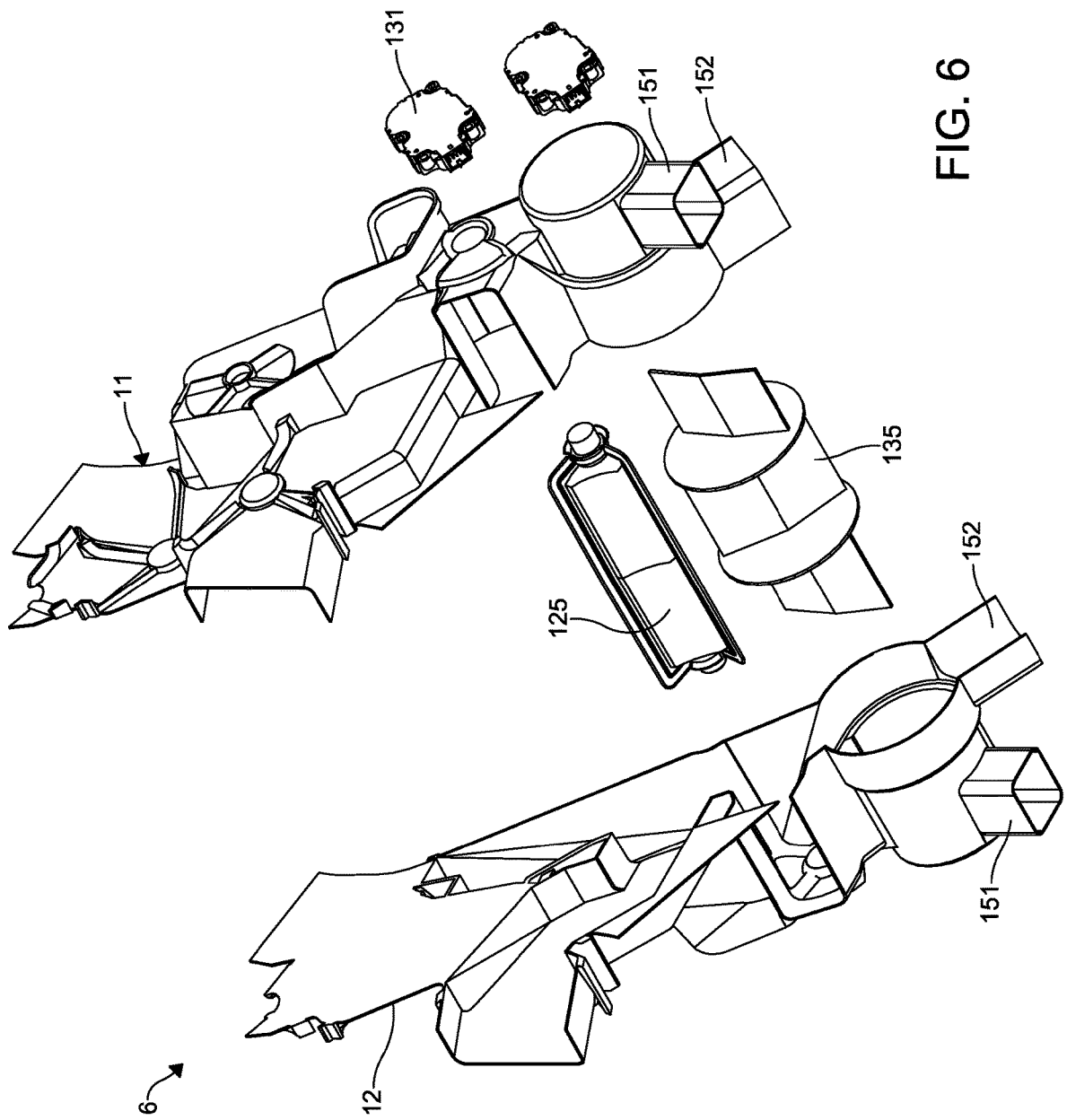
FIG. 6 is an exploded front perspective view of the casing module of FIG. 5 showing different components forming the casing module.

The secondary zone housing 6 is shown in isolation in FIGS. 5 and 6 to better illustrate the form and configuration thereof. In the illustrated embodiment, the secondary zone housing 6 is formed from two laterally separated housing shells 11, 12 that are connected to each other at a central seam 13 that is arranged on a plane perpendicular to the lateral direction of the air-handling casing 2 when the secondary zone housing 6 is received within the primary zone housing 5. The seam 13 may be disposed along a central plane of the secondary zone housing 6 at a position substantially equally spaced from each of the lateral sidewalls 7, 8 of the primary zone housing 5 when the secondary zone housing 6 is received therein, as desired. The use of the laterally assembled housing shells 11, 12 allows for the components disposed within a hollow interior of the secondary zone housing 6 to be positioned between the housing shells 11, 12 before the housing shells 11, 12 are brought together laterally at the seam 13 to easily couple the associated components to the secondary zone housing 6.

The manner in which the secondary zone housing 6 is received within the primary zone housing 5 results in the primary flow path 3 being partially defined by the inner facing surfaces of the primary zone housing 5 as well as the outer facing surfaces of the secondary zone housing 6 while the secondary flow path 4 is defined by the inner facing surfaces of the secondary zone housing 6. The secondary zone housing 6 accordingly forms a flow division between the primary flow path 3 and the secondary flow path 4 with respect to the air passing through the air-handling casing 2.

Although the secondary zone housing 6 is shown and described as a separate component received within the primary zone housing 5, it should be apparent that the primary flow path 3 and the secondary flow path 4 may be defined alternatively by altering the form and configuration of whatever housing components are assembled in forming the air-handling casing 2. For example, the air-handling casing 2 may be formed by a pair of housing shells meeting at the lateral central portion of the air-handling casing 2 with a laterally innermost portion of a first one of the housing shells cooperating with a laterally innermost portion of a second one of the housing shells to define the secondary flow path 4 therebetween, wherein the primary flow path 3 may in turn be defined by the laterally outermost portions of each of the cooperating housing shells surrounding the secondary flow path 4. One skilled in the art should appreciate that a variety of different housing configurations may be utilized in order to form an air-handling casing 2 having a beneficially smaller packaging size for establishing dual zone, tri-zone, or quad-zone control as disclosed hereinafter without necessarily departing from the scope of the present invention.

The air-handling casing 2 includes an evaporator core 24 and a heater core 26 disposed therein. The evaporator core 24 and the heater core 26 may be in communication with a source of cooled fluid (not shown) and a source of heated fluid (not shown), respectively. The evaporator core 24 may form a portion of a refrigerant circuit of the air conditioning system associated with the air-handling system 1. The evaporator core 24 is configured to exchange heat energy between the air flowing through the air-handling casing 2 and the cooled fluid flowing through the evaporator core 24 to cool and/or dehumidify the air. The cooled fluid may be a low temperature and low pressure refrigerant circulating through the refrigerant circuit associated with the air-handling system 1, as desired. Although described as an evaporator core 24, it should be understood that any form of cooling device in heat exchange relationship with any device or system of the motor vehicle may be employed for use with the air-handling system 1 without necessarily departing from the scope of the present invention.

The heater core 26 may form a radiator associated with a coolant circuit used to cool an engine of the motor vehicle. The heater core 26 is configured to exchange heat energy between the air flowing through the air-handling casing 2 and a heated portion of the coolant circulated through the coolant circuit in order to heat the air delivered to the passenger compartment of the vehicle. Alternatively, the heater core 26 may be in heat exchange relationship with a coolant used to cool a battery or other heat producing device associated with the motor vehicle, or the heater core 26 may be a condenser/gas cooler forming a portion of the aforementioned refrigerant circuit of the air-handling system 1 exposed to a high temperature and high pressure portion of the refrigerant disposed downstream of a high pressure end of an associated compressor (not shown) of the refrigerant circuit. In other embodiments, the heater core 26 may be a heating device such as a PTC heater configured to produce heat using an electrical source. The heater core 26 may also be provided as any combination of the aforementioned heating devices or heat exchanging structures arranged in series with respect to a flow of the air therethrough for selectively heating the air passing through the heater core 26 in a desired manner depending on a selected mode of operation of the air-handling system 1 or a heating requirement for conditioning the air delivered to the passenger compartment of the vehicle in accordance with the desires of the occupants thereof. It should be understood that any form of heating device or heat exchanging structure suitable for heating a flow of air therethrough may be used to form the heater core 26 without necessarily departing from the scope of the present invention.

The evaporator core 24 is disposed at a downstream end of an inlet section 17 of the air-handling casing 2. The inlet section 17 may include a blower or fan (not shown) for causing the supply of the air to flow towards the evaporator core 24 at a position downstream of the blower or fan. The supply of the air can be provided from outside of the vehicle, recirculated from the passenger compartment of the vehicle, or a mixture of the two, as desired. A filter (not shown) can be provided upstream or downstream of the blower or fan of the inlet section 17 to filter out debris or contaminants carried by the supply of air to prevent the ingress of such debris or contaminants into the passenger compartment of the vehicle via the remainder of the air-handling casing 2.

The evaporator core 24 extends across an entirety of the flow cross-section of the air-handling casing 2 to ensure that all air passing through the air-handling casing 2 and into the passenger compartment flows through the evaporator core 24. The heater core 26 extends laterally between the lateral side walls 7, 8 of the air-handling casing 2 at a position downstream of the evaporator core 24, but does not occupy an entirety of the flow cross-section of the air-handling casing 2 to allow for at least a portion of the air passing through the air-handling casing 2 to selectively bypass the heater core 26, in contrast to the described configuration of the evaporator core 24. In the provided embodiment, the heater core 26 is disposed at an angle relative to the evaporator core 24 to cause the air passing therethrough to be flowing at a different angle than the air flowing through the evaporator core 24. Specifically, the illustrated embodiment includes the heater core 26 arranged at an angle of about 65 degrees relative to the evaporator core 24 with the flow of air through the heater core 26 flowing upwardly therethrough, which is in contrast to the evaporator core 24 which includes the flow of air therethrough flowing substantially horizontally from the perspective of FIGS. 1 and 2. In some embodiments, the heater core 26 may be arranged horizontally to cause the air flowing therethrough to flow in a substantially vertical direction perpendicular to the direction of flow of the air flowing through the evaporator core 24, as desired. The angled or horizontal arrangement of the heater core 26 may aid in reducing the packaging space occupied by the air-handling casing 2 with respect to the vertical direction thereof as depicted from the perspective of FIGS. 1 and 2. However, it should be apparent that the heater core 26 may alternatively be arranged substantially parallel to the evaporator core 24 or at other desired angles while still maintaining the general flow configuration shown and described hereinafter with respect to the primary flow path 3 and the secondary flow path 4.

In the present embodiment, the secondary zone housing 6 forms a lateral division of the primary flow path 3 at a position downstream of the evaporator core 24 for forming each of a first primary flow path 3a formed to a first side of the secondary zone housing 6 and a second primary flow path 3b formed to an opposing second side of the secondary zone housing 6. The first primary flow path 3a and the second primary flow path 3b are substantially identical and symmetric in configuration with respect to the lateral direction of the air-handling casing 2, hence the illustration and description of either of the primary flow paths 3a, 3b hereinafter should be understood to also apply to the other of the primary flow paths 3a, 3b. In the present embodiment, the first primary flow path 3a leads to the front seat driver side zone of the passenger compartment, the second primary flow path 3b leads to the front seat passenger side zone of the passenger compartment, and the secondary flow path 4 leads generally to the rear seat zone of the passenger compartment. However, the different flow paths 3a, 3b, 4 may lead to any zones of the passenger compartment in need of variable air conditioning without necessarily departing from the scope of the present invention. For example, it is conceivable that a driverless vehicle may include the passengers thereof situated in a different configuration from that of a traditional vehicle with the different sets of vents configured differently to accommodate the differences in priority of the different seating zones, so it may be desirable for the different flow paths 3a, 3b, 4 as shown and described hereinafter to relate to different zones of the passenger compartment from those generally described herein.

Although the primary flow path 3 is shown and described as eventually being divided into the different flow paths 3a, 3b as shown and described hereinafter, it should also be apparent that the primary flow path 3 may also be provided to lead to a common set of vents having the air conditioned in the same manner with respect to each of the associated vents without necessarily departing from the scope of the present invention. Such a configuration could include the secondary zone housing 6 temporarily dividing the primary flow path 3 with respect to the lateral direction of the air-handling casing 2 before having the laterally divided flows of air recombined after having passed around the secondary zone housing 6. The recombined and mixed air can then proceed downstream of the secondary zone housing 6 to include common characteristics before being delivered to the common set of vents such as the vents generally associated with the front seat zone of the passenger compartment. The recombining of the air after having passed by the secondary zone housing 6 is mentioned briefly hereinafter when discussing the manner in which the different flows of air through the flow paths 3a, 3b, 4 are conditioned independently from each other.

The inlet section 17 is common to all of the flow paths 3a, 3b, 4 formed through the air-handling casing 2. Downstream of the inlet section 17, each of the different flow paths 3a, 3b, 4 further include a corresponding conditioning section, mixing section, and delivery section, wherein the air flows through the identified sections in the provided order. More specifically, the first primary flow path 3a includes a first primary conditioning section 18a, a first primary mixing section 20a, and a first primary delivery section 22a, the second primary flow path 3b includes a second primary conditioning section 18b, a second primary mixing section 20b, and a second primary delivery section 22b, and the secondary flow path 4 includes a secondary conditioning section 118, a secondary mixing section 120, and a secondary delivery section 122.

The first primary conditioning section 18a of the first primary flow path 3a includes a first primary temperature control door 25a disposed therein for controlling a distribution of the flow of air between a first primary cool air pathway 27a and a first primary warm air pathway 28a of the first primary flow path 3a. The second primary conditioning section 18b of the second primary flow path 3b includes a second primary temperature control door 25b disposed therein for controlling a distribution of the flow of air between a second primary cool air pathway 27b and a second primary warm air pathway 28b of the second primary flow path 3b. Similarly, the secondary conditioning section 118 of the secondary flow path 4 includes a secondary temperature control door 125 disposed therein for controlling a distribution of the flow of air between a secondary cool air pathway 127 and a secondary warm air pathway 128 formed within the secondary flow path 4.

As used herein, the phrase "warm air pathway" refers to a pathway for the air to flow through the heater core 26 before proceeding to the downstream arranged mixing section 20a, 20b, 120 of the corresponding one of the flow paths 3a, 3b, 4. The phrase "cool air pathway" refers to a pathway for the air to bypass the heater core 26 before proceeding to the downstream arranged mixing section 20a, 20b, 120 of the corresponding one of the flow paths 3a, 3b, 4. Although referred to as cool air pathways, the evaporator core 24 is not necessarily always being circulated by a flow of the low temperature and low pressure refrigerant of the associated refrigerant circuit for cooling the air flowing through the evaporator core 24, as such flow of the refrigerant through the evaporator core 24 may be dependent on a selected operating mode of the refrigerant circuit as determined by the occupants of the passenger compartment.

In some circumstances, the low temperature and low pressure refrigerant may be circulated through the evaporator core 24 with the intention of cooling and dehumidifying all of the air passing through the air-handling casing 2 before then distributing the cooled and dehumidified air to either flow through or to bypass the heater core 26 depending on the settings selected by the occupants of the passenger compartment. For example, the air cooled and dehumidified within the evaporator core 24 may all bypass the heater core 26 for maximizing the cooling capacity of the air-handling system 1 or the air cooled and dehumidified within the evaporator core 24 may all flow through the heater core 26 for establishing a maximized heating capacity of what is typically referred to as a reheating mode of operation of the air-handling system 1, as desired. In other circumstances, the air may not be cooled and dehumidified within the evaporator core 24 such that the temperature of the air after flowing through the evaporator core 24 is largely determined by the distribution of the air flowing through or bypassing the heater core 26. In any event, regardless of the operation of the evaporator core 24, the "cool air pathways" are identified herein based on the bypassing of the air around the heater core 26 rather than the specific cooling effect applied to the air when passing through the evaporator core 24 due to the manner in which all air passes through the evaporator core 24 before being divided into the described cool and warm air pathways.

As best shown in FIGS. 1-3, the primary zone housing 5 includes a wall segment 19 extending laterally between the lateral side walls 7, 8 at a position downstream of the evaporator core 24. The heater core 26 is also positioned with one end thereof abutting the wall segment 19 and an opposing end thereof abutting a portion of the peripheral wall 9. The wall segment 19 accordingly divides the first primary flow path 3a into the first primary cool air pathway 27a and the first primary warm air pathway 28a. The wall segment 19 further divides the second primary flow path 3b into the second primary cool air pathway 27b and the second primary warm air pathway 28b. Specifically, the cool air pathways 27a, 27b are formed to a first side of the wall segment 19 (above the wall segment 19 from the perspective of FIGS. 1-3) while the warm air pathways 28a, 28b are formed to an opposing second side of the wall segment 19 (below the wall segment 19 from the perspective of FIGS. 1-3). The heater core 26 extends across an entirety of the flow cross-section of each of the warm air pathways 28a, 28b such that all air passing through each of the respective warm air pathways 28a, 28b and to the corresponding one of the downstream arranged mixing sections 20a, 20b must pass through the heater core 26.

Referring now to FIG. 1, only the first primary flow path 3a is shown. However, as mentioned previously, the second primary flow path 3b includes substantially the same general configuration mirrored about a central plane of the air-handling casing 2 arranged perpendicular to the lateral direction thereof, hence the following description of the first primary flow path 3a and the components thereof also generally applies to the second primary flow path 3b and the components thereof.

The first primary temperature control door 25a is disposed at a position adjacent the wall segment 19 at a downstream end of each of the first primary cool air pathway 27a and the first primary warm air pathway 28a. The first primary temperature control door 25a is disclosed as a barrel-type door having an air directing wall radially spaced from an axis of rotation thereof, wherein the air directing wall is configured to pivot relative to the axis of rotation based on the settings selected by the occupants of the passenger compartment. The axis of rotation of the first primary temperature control door 25a may be defined by a shaft or pair of shaft segments, as desired, with the axis of rotation disposed within the first primary mixing section 20a or at a boundary between the first primary conditioning section 18a and the first primary mixing section 20a. The first primary temperature control door 25a may include sealing flaps disposed around a perimeter of the air directing wall in order to form a fluid-tight seal between the air directing wall and the corresponding surfaces of the air-handling casing 2 when the first primary temperature control door 25a is rotated to the specified positions thereof.

The first primary temperature control door 25a is shown in FIGS. 1 and 3 as being in a first position thereof wherein the first primary temperature control door 25a is blocking air from passing through the first primary cool air pathway 27a while allowing for a maximized flow of the air to pass through the first primary warm air pathway 28a. The first primary temperature control door 25a is also configured to be adjustable to a second position (rotated counter-clockwise from the perspective of FIG. 1) for blocking air from passing through the first primary warm air pathway 28a while allowing for a maximized flow of the air to pass through the first primary cool air pathway 27a. The first primary temperature control door 25a is further configured to be adjustable to a plurality of intermediate positions between the first position and the second position for variably distributing the air to pass through the first primary cool air pathway 27a and the first primary warm air pathway 28a.

One skilled in the art should appreciate that a variety of different configurations of the first primary temperature control door 25a may be utilized without necessarily departing from the scope of the present invention, so long as the first primary temperature control door 25a is provided at a downstream end of each of the first primary cool air pathway 27a and the first primary warm air pathway 28a for controlling a distribution of the air passing through each of the pathways 27a, 28a in similar fashion to that described hereinabove. For example, the first primary temperature control door 25a may instead be provided as a sliding door mechanism positioned and oriented for variably blocking passage of the air through the first primary cool air pathway 27a and the first primary warm air pathway 28a in the manner described including a first position, a second position, and a plurality of intermediate positions of the sliding door mechanism.

The first primary mixing section 20a is disposed immediately downstream of the conditioning section 18a and forms a portion of the first primary flow path 3a wherein the air passing through the first primary cool air pathway 27a and the first primary warm air pathway 28a can mix to form a more homogeneous temperature of the air passing through the first primary flow path 3a, assuming that at least a portion of the air is distributed to each of the distinct pathways 27a, 28a in order to require such mixing of the different air flows.

The first primary delivery section 22a is disposed immediately downstream of the first primary mixing section 20a and includes a plurality of mode control doors and conduits for controlling a distribution of the air passing through the first primary flow path 3a that is distributed to each of the different vents associated with the first primary zone of the passenger compartment. For example, one of the conduits may lead to the window defrost vents, one of the conduits may lead to the panel vents, and another of the conduits may lead to the floor vents formed to the driver side of the front seat zone, as one non-limiting example, wherein the different mode control doors determine the distribution of the air originating from the first primary mixing section 20a that is delivered to each of the described vents based on settings selected by the occupants of the passenger compartment.

As can be seen in FIG. 3, the first primary temperature control door 25a is operatively coupled to an actuator 31a while the second primary temperature control door 25b is operatively coupled to an independently provided actuator 31b. In the present embodiment, each of the actuators 31a, 31b may be provided as an electric motor having a rotor mechanically engaged to one of the temperature control doors 25a, 25b for selectively pivoting each of the temperature control doors 25a, 25b about the axis of rotation thereof to adjust each of the temperature control doors 25a, 25b to one of the positions described hereinabove. The use of independently provided actuators 31a, 31b with each of the actuators 31a, 31b responsible for the adjustment of only one of the temperature control doors 25a, 25b allows for the temperature of the air to be controlled independently with respect to each of the first primary flow path 3a and the second primary flow path 3b. As such, the occupants of the passenger compartment may select different temperature settings for each of the front seat driver side zone and the front seat passenger side zone via the independent adjustment of each of the different temperature control doors 25a, 25b.

Alternatively, the occupants of the front seat zone may desire to have a common temperature setting for the front seat driver side zone and the front seat passenger side zone in a manner wherein a single temperature setting is selected for the entirety of the front seat zone, wherein a controller associated with the adjustment of the temperature control doors 25a, 25b ensures that each of the temperature control doors 25a, 25b is adjusted to the same position with respect to each of the primary flow paths 3a, 3b to provide for the same temperature of the air in each of the respective delivery sections 22a, 22b.

As mentioned above, the air-handling casing 2 may be provided to include a configuration having only a single primary flow path 3 wherein the air passing to either side of the secondary zone housing 6 is recombined within a single mixing section before proceeding to a single delivery section of the primary flow path 3. Under such a circumstance, the temperature control doors 25a, 25b may each be associated with only a single actuator that simultaneously adjusts each of the temperature control doors 25a, 25b to the same position for ensuring that the air flows recombining in the single mixing section have similar temperature characteristics, as desired. The temperature controls doors 25a, 25b may, for example, be linked by a single common shaft extending laterally therebetween.

As mentioned above, the secondary zone housing 6 defines the secondary flow path 4 and generally includes a secondary cool air conduit 102, a secondary warm air conduit 106, a secondary mixing chamber 110, a secondary delivery chamber 112, and a plurality of secondary delivery conduits 151, 152. The secondary cool air conduit 102 defines the secondary cool air pathway 127 of the secondary flow path 4, the secondary warm air conduit 106 defines the secondary warm air pathway 128 thereof, the secondary mixing chamber 110 defines the secondary mixing section 120 thereof, and the secondary delivery chamber 112 and the plurality of secondary delivery conduits 151, 152 cooperate to define the secondary delivery section 122 thereof.

As can be seen in FIGS. 5 and 6, the secondary zone housing 6 further includes a dividing wall 140 formed along a central plane thereof with respect to the lateral direction of the air-handling casing 2. The dividing wall 140 cooperates with the secondary cool air conduit 102 to form the lateral division of the primary flow path 3 into the first primary flow path 3*a* and the second primary flow path 3*b* within the primary zone housing 5. More specifically, the dividing wall 140 includes a first segment 141 extending between the secondary cool air conduit 102 and the secondary warm air conduit 106 and a second segment 142 projecting from an upper surface of the secondary cool air conduit 102 opposite the first segment 141.

An upstream edge of the first segment 141 is disposed immediately adjacent a downstream side of the heater core 26 to form the initial division of the primary flow path 3 into the first primary warm air pathway 28*a* and the second primary warm air pathway 28*b*. Accordingly, the warm air pathways 28*a*, 28*b* of the present embodiment branch from a common warm air passageway 29 extending from a downstream side of the evaporator core 24 to an upstream side of the heater core 26 with the warm air passageway 29 positioned to the second side of the wall segment 19 (below the wall segment 19). In contrast, the disclosed position of the secondary cool air conduit 102 forms a division between the first primary cool air pathway 27*a* and the second primary cool air pathway 27*b* immediately downstream of the evaporator core 24 and to the first side of the wall segment 19 (above the wall segment 19) as can be seen from review of FIGS. 1-3. However, it should be apparent that the secondary zone housing 6 may form the initial division between the warm air pathways 28*a*, 28*b* at any position between the evaporator core 24 and the respective temperature control doors 25*a*, 25*b* to the second side of the wall segment 19 without significantly altering the manner of operation of the air-handling system 1. Similarly, the secondary cool air conduit 102 (or any other portion of the secondary zone housing 6) may form the initial division between the cool air pathways 27*a*, 27*b* at any position between the evaporator core 24 and the respective temperature control doors 25*a*, 25*b* to the first side of the wall segment 19 without significantly altering the manner of operation of the air-handling system 1.

The second segment 142 of the dividing wall 140 forms the division between the respective mixing sections 20*a*, 20*b* and delivery sections 22*a*, 22*b* of the primary flow path 3 at positions downstream of the secondary cool air conduit 102. The second segment 142 may also include the necessary structures for locating any shafts or the like defining the axes of rotation of the temperature control doors 25*a*, 25*b* and any mode control doors associated with the delivery sections 22*a*, 22*b*, as desired.

In the event that a single primary flow path 3 is utilized in the absence of the lateral division thereof, the secondary zone housing 6 may be provided in the absence of the dividing wall 140 to more easily allow for the air flows divided by the secondary cool air conduit 102 to immediately recombine and mix after flowing by the temperature control doors 25*a*, 25*b*.

The secondary cool air conduit 102 extends from an inlet end 103 disposed at the downstream side of the evaporator core 24 to an outlet end 104 leading into the secondary mixing chamber 110. As such, the air exiting the evaporator core 24 may be divided to flow through an interior of the secondary cool air conduit 102 along the secondary flow path 4 or around an exterior of the secondary cool air conduit 102 to either lateral side thereof for forming the divided cool air pathways 27*a*, 27*b*. The secondary cool air conduit 102 extends primarily in a direction parallel to a direction of flow of the air through the evaporator core 24 (perpendicular to the plane generally defined by the evaporator core 24) from the inlet end 103 to the outlet end 104 thereof. This parallel flow of the air through the secondary cool air conduit 102 prevents an undesirable pressure drop in the air when flowing towards the secondary mixing chamber 110. The inlet end 103 of the secondary cool air conduit 102 is preferably disposed to abut the downstream side of the evaporator core 24 to ensure that the air exiting the evaporator core 24 has a desired distribution between the primary flow paths 3*a*, 3*b* and the second flow path 4. However, the inlet end 103 of the secondary cool air conduit 102 may be disposed at a position between the downstream side of the evaporator core 24 and an upstream side of the wall segment 19 without necessarily departing from the scope of the present invention, but the secondary cool air conduit 102 may not receive the desired distribution of the air exiting the evaporator core 24 in comparison to the illustrated embodiment.

The secondary cool air conduit 102 is disposed to extend to the first side of the wall segment 19 (above the wall segment 19 from the perspective of FIGS. 1-3) with a bottom surface of the secondary cool air conduit 102 resting on the wall segment 19. The secondary cool air conduit 102 may also be positioned in a manner wherein the laterally innermost shafts or shaft segments of the temperature control doors 25*a*, 25*b* may be supported by the laterally outermost surfaces of the secondary cool air conduit 102, as best shown in FIG. 3.

The secondary warm air conduit 106 extends from an inlet end 107 disposed at a position immediately downstream of the heater core 26 to an outlet end 108 leading into the secondary mixing chamber 110. The inlet end 107 of the secondary warm air conduit 106 extends laterally to coincide substantially equally with each of the warm air pathways 28*a*, 28*b* of the primary flow paths 3*a*, 3*b* and is accordingly in fluid communication with each of the warm air pathways 28*a*, 28*b*. As such, the air exiting the heater core 26 is allowed to flow into the inlet end 107 of the secondary warm air conduit 106 along the secondary flow path 4 or to flow past the inlet end 107 of the secondary warm air conduit 106 and towards the respective mixing sections 20*a*, 20*b* of the laterally divided primary flow paths 3*a*, 3*b*.

The secondary temperature control door 125 may include a substantially similar structure to the previously described temperature control doors 25*a*, 25*b* including an air directing wall spaced apart from an axis of rotation of the secondary temperature control door 125 as defined by one or more shaft segments. The secondary temperature control door 125 may further include sealing flaps around a perimeter thereof to form a fluid tight seal with engaging portions of the secondary zone housing 6 depending on the rotational position of the secondary temperature control door 125. The secondary temperature control door 125 may include the axis of rotation thereof disposed within the secondary mixing section 120 as defined by the secondary mixing chamber 110 to allow for the air directing wall to be positionable to block air flow through the outlet end 104, 108 of either of the secondary cool air conduit 102 or the secondary warm air conduit 106.

Figure 4A:
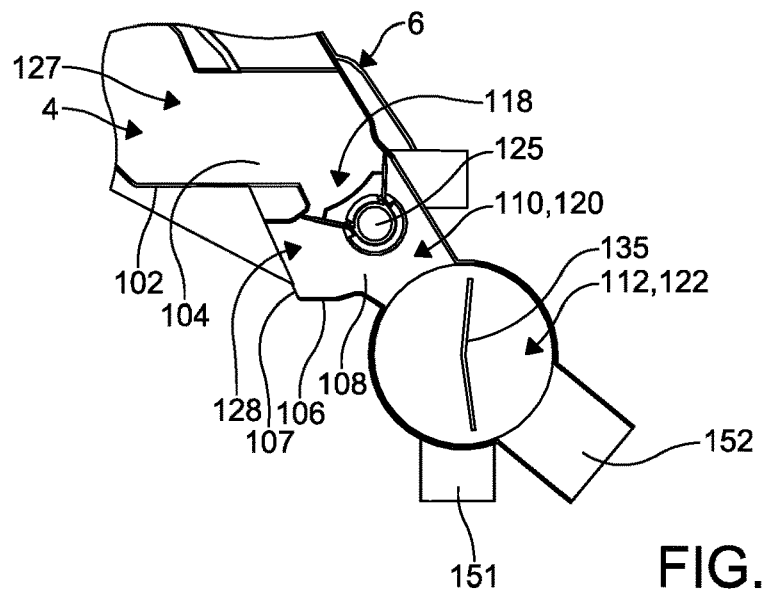
Figure 4B:
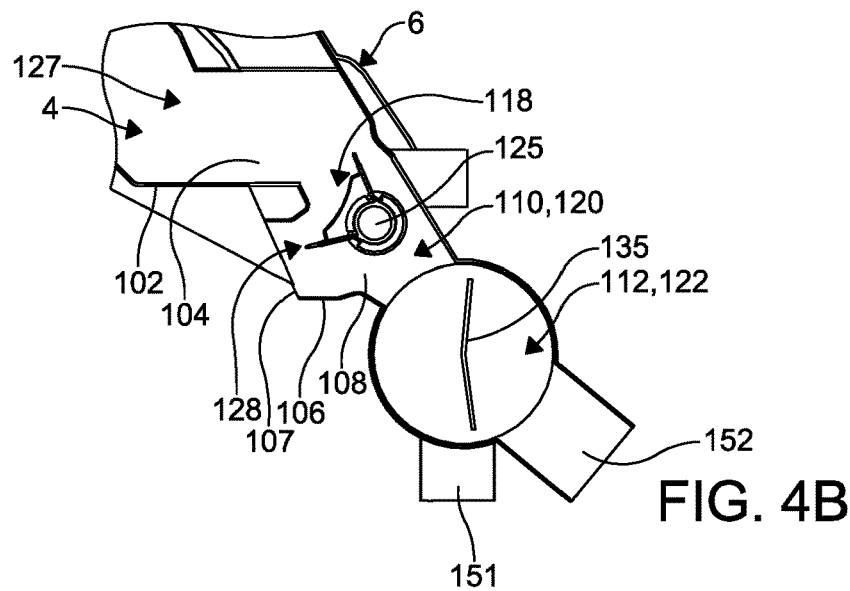
Figure 4C:
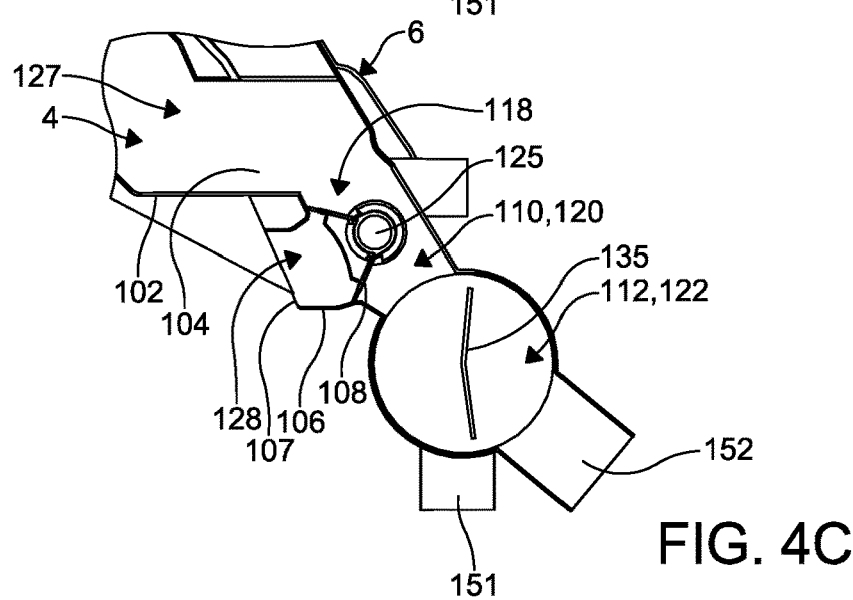

Referring to FIGS. 4A-4C, the secondary temperature control door 125 is adjustable between a first position (FIG. 4A) blocking flow through the secondary cool air conduit 102 while allowing flow through the secondary warm air conduit 106 and a second position (FIG. 4C) blocking flow through the secondary warm air conduit 106 while allowing flow through the secondary cool air conduit 102. The secondary temperature control door 125 is also adjustable to a plurality of intermediate positions (one example of which is shown in FIG. 4B) for controlling the distribution of the air between the secondary cool air conduit 102 and the secondary warm air conduit 106. The air originating from the secondary cool air conduit 102 and the air originating from the secondary warm air conduit 106 are mixed within the secondary mixing chamber 110 immediately after passing by the associated air directing wall of the secondary temperature control door 125, assuming that there is a distribution of air flow between the secondary cool air conduit 102 and the secondary warm air conduit 106.

The secondary temperature control door 125 may include an alternative structure to that shown and described so long as the temperature control door 125 is able to distribute the air flows between the secondary cool air conduit 102 and the secondary warm air conduit 106 in the manner described hereinabove at the downstream arranged outlet ends 104, 108 thereof. For example, as mentioned above with respect to the temperature control doors 25a, 25b, the secondary temperature control door 125 may be provided as a sliding door mechanism capable of fully or partially blocking the outlet ends 104, 108 of the secondary cool air conduit 102 and the secondary warm air conduit 106, as desired.

As shown in FIGS. 5 and 6, the secondary temperature control door 125 is mechanically coupled to an actuator 131 capable of rotating the secondary temperature control door 125 to any of the above described positions for controlling the distribution of the air between the secondary cool air pathway 127 as formed by the secondary cool air conduit 102 and the secondary warm air pathway 128 as formed by the secondary warm air conduit 106. The actuator 131 may once again be an electric motor or the like, as desired. The actuator 131 may be disposed laterally outwardly of the secondary zone housing 6 while the opposing shaft segments of the secondary temperature control door 125 may be supported by opposing inner surfaces of the secondary zone housing 6.

The actuator 131 associated with the secondary temperature control door 125 is configured to be controlled independently of the actuators 31a, 31b associated with the temperature control doors 25a, 25b to allow for tri-zone control of the air-handling system 1. Specifically, the first primary temperature control door 25a is adjustable to control a temperature of the air delivered to the front seat driver side zone of the passenger compartment, the second primary temperature control door 25b is adjustable to control a temperature of the air delivered to the front seat passenger side zone of the passenger compartment, and the secondary temperature control door 125 is adjustable to control a temperature of the air delivered to the rear seat zone of the passenger compartment. Each of the associated actuators 31a, 31b, 131 may be in signal communication with one or more controllers associated with the air-handling system 1 in a manner wherein each of the actuators 31a, 31b, 131 may be activated independently of each other for independently controlling the different temperature control doors 25a, 25b, 125. Each of the actuators 31a, 31b, 131 may be controlled by an independently provided user interface accessible to the occupants of the passenger compartment. For example, a first user interface may disposed for access by the driver of the vehicle, a second user interface may be disposed for access by a front passenger occupant of the vehicle, and a third user interface may be disposed for access by a rear seat occupant of the vehicle.

The configuration of the secondary flow path 4 relative to the primary flow path 3 necessitates the positioning of the temperature control doors 25a, 25b of the primary flow paths 3a, 3b downstream of the division of the different air flows into the cool and warm air pathways 27a, 27b, 28a, 28b to allow for the independent conditioning of the air entering the secondary mixing chamber 110 through the secondary warm air conduit 106. For example, in some air-handling casings the associated temperature control doors are disposed upstream of a division of the associated flow path into the cool and warm air pathways thereof. Such a configuration is not suitable for the disclosed air-handling system 1 as such an upstream arranged temperature control door could prevent the desired flow of air from reaching the inlet end 107 of the secondary warm air conduit 106 if the upstream arranged temperature control door is adjusted to a position for blocking the flow of air from approaching the associated heater core. The manner in which the inlet ends 103, 107 of the different conduits 102, 106 are spaced apart from each other also leads to the need for the temperature control door 125 to also be at a downstream arranged position relative to the cool and warm air pathways 127, 128 to prevent the need for an independent temperature control door within each of the cool and warm air pathways 127, 128. The disclosed configuration accordingly allows for the desired distribution of the independently conditioned air flows to multiple different zones of the passenger compartment while minimizing the number of the necessary temperature control doors and the number of the necessary actuators.

The secondary delivery chamber 112 is disposed immediately downstream of the secondary mixing chamber 110 and includes a secondary mode door 135 rotatably disposed therein. A first delivery conduit 151 and a second delivery conduit 152 branch from each lateral side of the secondary delivery chamber 112. Each of the first delivery conduits 151 may lead to a rear seat floor zone of the passenger compartment while each of the second delivery conduits 152 may lead to a rear seat console zone of the passenger compartment, as desired. The secondary mode door 135 is adjustable between a first position directing flow through the first delivery conduits 151 while preventing flow through the second delivery conduits 152 and a second position directing flow through the second delivery conduits 152 while preventing flow through the first delivery conduits 151. The secondary mode door 135 is also adjustable to a plurality of intermediate positions for controlling the distribution of the air between the first delivery conduits 151 and the second delivery conduits 152.

In use, the air-handling system 1 draws air in through the inlet section 17 and through the evaporator core 24. After flowing through the evaporator core 24, the air is then divided into the primary flow path 3 and the secondary flow path 4 based on whether the air flows along the exterior of the secondary zone housing 6 or within the interior of the secondary zone housing 6.

As shown best via the three different positions of the secondary temperature control door 125 in FIGS. 4A-4C, the adjustment of the secondary temperature control door 125 between the described and illustrated positions thereof causes different distributions of relatively cool and relatively warm air to enter and mix within the secondary mixing chamber 110. The air then exits the secondary mixing chamber 110 wherein the secondary mode control door 135 determines the distribution of the air between the first and second delivery conduits 151, 152 disposed to each lateral side of the secondary delivery chamber 112.

Each of the primary temperature control doors 25a, 25b is similarly adjusted between the described positions thereof to cause different distributions of relatively cool and relatively warm air to enter and mix within the primary mixing sections 20a, 20b formed to either lateral side of the secondary zone housing 6. The air flows then exit each of the primary mixing sections 20a, 20b where the laterally divided air flows are then distributed to the different primary zones of the passenger compartment via the corresponding primary delivery sections 22a, 22b.

Referring again to FIGS. 5 and 6, a modification of the disclosed air-handling system 1 for creating the aforementioned quad-zone temperature control is briefly discussed. As can be seen by comparison of FIG. 5 to FIG. 6, the seam 13 formed between the housing shells 11, 12 of the secondary zone housing 6 divides the secondary zone housing 6 into first and second lateral halves in similar fashion to the manner in which the secondary zone housing 6 divides the primary flow path 3 into laterally divided first and second flow paths 3a, 3b. Additionally, a set of the delivery conduits 151, 152 including one of the first delivery conduits 151 and one of the second delivery conduits 152 is associated with each lateral half of the secondary zone housing 6.

In view of the described lateral symmetry of the secondary zone housing 6, the inclusion of a dividing wall or the like corresponding to the plane of the seam 13 of the secondary zone housing 6 results in the division of the secondary flow path 4 into laterally divided flow paths that can then be associated with two different zones of the passenger compartment, such as a rear seat driver side zone and a rear seat passenger side zone thereof. The inclusion of such a dividing wall also requires the secondary temperature control door 125 and the secondary mode door 135 to similarly be divided laterally with each of the divided doors associated with one of the lateral sides of the secondary zone housing 6. Such a division of the doors 125, 135 requires the need for an additional actuator to be associated with each of the newly formed doors, thereby doubling the number of the actuators necessary to control the flow of the air through the secondary zone housing 6.

The upstream edges of such a dividing wall are disposed at any position upstream of the newly divided temperature control door 125 with respect to each of the secondary cool air conduit 102 and the secondary warm air conduit 106, with the dividing wall continuing downstream of each of the upstream edges throughout the remainder of the secondary zone housing 6. However, the upstream edges may begin at each of the inlet end 103 of the secondary cool air conduit 102 and the inlet end 107 of the secondary warm air conduit 106, but such a positioning may limit the amount of cool or warm air flowing through the secondary zone housing 6 if considerably different temperature settings are selected with respect to each of the laterally divided zones of the passenger compartment associated with the secondary zone housing 6. The resulting air-handling system accordingly operates in identical fashion to the disclosed air-handling system 1 with the exception of the need for independent control of each of the laterally divided doors as provided by the lateral division of the secondary temperature control door 125 and the secondary mode door 135. It should also be understood that the laterally separated doors would also require additional shaft segments for engaging the newly provided dividing wall to allow for the independent control of the doors to each side of the dividing wall.

The disclosed configuration of the air-handling system 1 provides numerous advantages over similar dual-zone, tri-zone, or quad-zone systems. First, the positioning of each of the described flow paths and control doors allows for the independent temperature and flow control of any number of different zones of the passenger compartment while minimizing the required number of independently controlled actuators. Second, the manner in which the secondary cool air conduit 102 extends through the primary flow path 3 from a position directly downstream of the evaporator core 24 eliminates the need for an additional flow path to be formed through the air-handling casing 2 at a position below the described warm air passage 29, hence the warm air passage 29 can extend along a peripheral portion of the air-handling casing 2. This direct communication of the air from the evaporator core 24 to the secondary mixing section 120 of the secondary zone housing 6 accordingly reduces the necessary packaging space required in a first direction of the air-handling casing 2 representative of the vertical direction of the air-handling casing 2 as shown in FIGS. 1-3. Third, the disclosed configuration of the secondary cool air conduit 102 through the air-handling casing 2 and the secondary warm air conduit 106 immediately adjacent the heater core 26 also eliminates the need for the cool air flows or the warm air flows to be routed around a periphery of the air-handling casing 2 to maintain the desired relationships disclosed herein, which in turn reduces the necessary packaging space required in a second direction of the air-handling casing 2 representative of the horizontal direction of the air-handling casing 2 as shown in FIGS. 1-3. The disclosed configuration of the air-handling casing 2 accordingly reduces the space occupied by the air-handling casing 2 in two perpendicularly arranged directions for beneficially providing additional space for other components to be packaged within the associated vehicle adjacent the air-handling casing 2.

Figure 7:
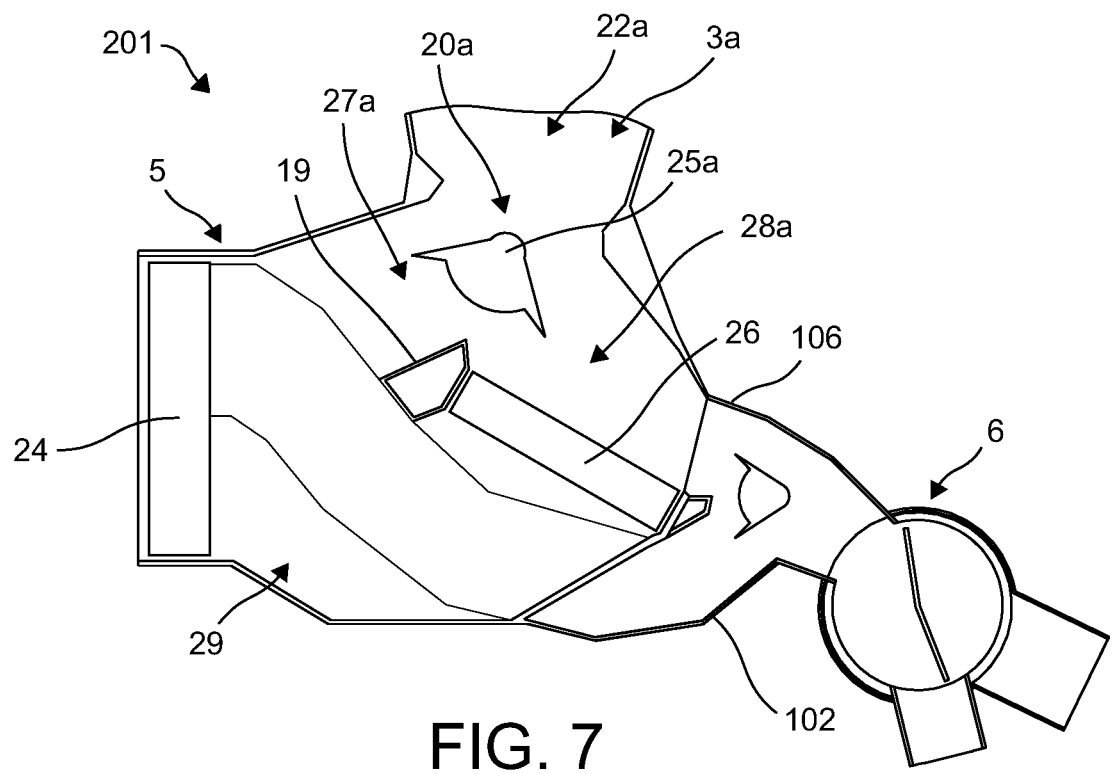
FIG. 7 is a fragmentary cross-sectional elevational view of an air-handling system according to another embodiment of the present invention as shown from a perspective outside of a secondary cool air conduit within a first lateral half of the air-handling system.
Figure 8:
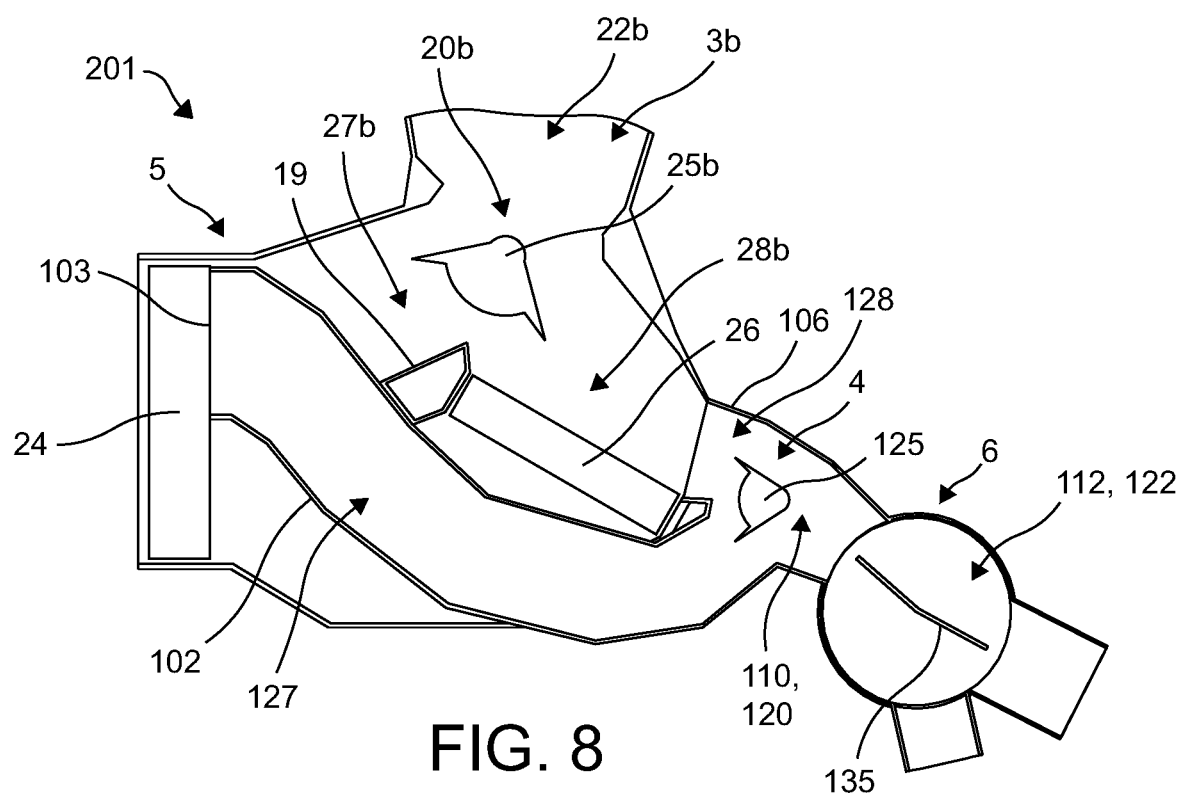
FIG. 8 is a fragmentary cross-sectional elevational view of the air-handling system of FIG. 7 as shown from a perspective through the secondary cool air conduit within a second lateral half of the air-handling system.

FIGS. 7 and 8 illustrate an air-handling system 201 according to another embodiment of the present invention. The air-handling system 201 is substantially similar in most respects to the air-handling system 1 and operates in substantially the same manner, hence further description of the various different modes of operation of the air-handling system 201 is omitted herefrom. Like elements of the air-handling system 201 are accordingly denoted with the same reference numerals as the air-handling system 1 hereinafter. FIGS. 7 and 8 show the air-handling system 201 from opposing lateral sides of the division of the air-handling system 201 into the first primary flow path 3a and the second primary flow path 3b, wherein FIG. 7 shows the air-handling system 201 from the perspective of a cross-section formed through the first primary flow path 3a and outside of the secondary cool air conduit 102 of the secondary flow path 4 while FIG. 8 shows the air-handling system 201 from the perspective of a cross-section formed through the second primary flow path 3b and the secondary cool air conduit 102.

The main difference present between the disclosed air-handling systems 1, 201 relates to an alternative positioning of the secondary cool air conduit 102 of the air-handling system 201 (defining the secondary cool air pathway 127) in comparison to the secondary cool air conduit 102 of the air-handling system 1. Specifically, whereas the air-handling system 1 includes the secondary cool air conduit 102 routed at a position above the wall segment 19 (from the perspective of FIGS. 1-3) and downstream of the heater core 26 with the secondary cool air conduit 102 forming the lateral division of the primary flow path 3 into the first primary cool air pathway 27a and the second primary cool air path 27b along a length of each of the cool air pathways 27a, 27b, the secondary cool air conduit 102 of the air-handling system 201 only initially forms the lateral division between the cool air pathways 27a, 27b before being routed through the warm air pathway 29 below the wall segment 19 at a position upstream of the heater core 26. In some embodiments, the rerouted secondary air conduit 102 may also form the initial lateral division of the warm air pathway 29 into the first primary warm air pathway 28a and the second primary warm air pathway 28b at the position upstream of the heater core 26. The secondary cool air conduit 102 of the air-handling system 201 once again merges with the secondary warm air conduit 106 with the secondary temperature control door 125 controlling the distribution of the air passing towards the secondary zone of the passenger compartment through each of the air conduits 102, 106 to control the temperature of the air delivered to the secondary zone. The alternative routing of the secondary cool air conduit 102 below the heater core 26 results in the relative positioning of the air conduits 102, 106 being reversed (vertically) in FIGS. 7 and 8 from that disclosed in FIGS. 1 and 2 while achieving the same general flow configuration.

The secondary cool air conduit 102 and secondary warm air conduit 106 may once again form portions of the independently provided secondary zone housing 6 incorporated within the primary zone housing 5 at a laterally central position of the air-handling system 201, as desired, but alternative housing configurations for forming the air-handling system 201 may be utilized without necessarily departing from the scope of the present invention. The alternatively configured secondary zone housing 6 may further include a different shape and configuration of the corresponding dividing wall used to laterally divide the primary flow path 3 into the first primary flow path 3a and the second primary flow path 3b, as desired, such as extending the corresponding dividing wall to the position occupied by the secondary cool air conduit 102 above the wall segment 19 as illustrated in FIGS. 1 and 2. In other embodiments, the dividing wall may instead be formed by a portion of the primary zone housing 5 with a leading edge of the dividing wall disposed at a suitable position downstream of the illustrated position of the secondary cool air conduit 102 of FIGS. 7 and 8. It should be apparent to one skilled in the art that a variety of different configurations may be provided for dividing the air-handling system 201 into the lateral halves for providing the tri-zone or quad-zone control disclosed with reference to the air-handling system 1 of FIGS. 1-6 while still routing the secondary cool air conduit 102 to the alternative position shown in FIGS. 7 and 8. Lastly, it should also be apparent from a review of FIGS. 7 and 8 that the secondary cool air conduit 102 may alternatively be routed along the bottom portion (from the illustrated perspective) of the primary zone housing 5 all the way from the downstream side of the evaporator core 24 to the secondary warm air conduit 106 so long as the dividing wall is extended to the appropriate position for forming the division between the first and second primary flow paths 3a, 3b absent the presence of the secondary cool air conduit 102 above the wall segment 19.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air-handling system for a vehicle comprising:
an evaporator core disposed in an air-handling casing configured to receive a flow of air therethrough;
a heater core disposed in the air-handling casing at a position downstream of the evaporator core with respect to the flow of the air;
a primary flow path formed within the air-handling casing leading to a primary zone of a passenger compartment of the vehicle, the primary flow path divided into a primary cool air pathway receiving air bypassing the heater core and a primary warm air pathway receiving air passing through the heater core; and
a secondary flow path formed within the air-handling casing leading to a secondary zone of the passenger compartment, the secondary flow path including a secondary cool air pathway branching from the primary flow path downstream of the evaporator core and a secondary warm air pathway branching from the primary flow path downstream of the heater core, the secondary cool air pathway receiving air bypassing the heater core and the secondary warm air pathway receiving air passing through the heater core, wherein the air-handling casing is formed by cooperation of a primary zone housing and a secondary zone housing, a part of which is accommodated in the primary zone housing, and the secondary zone housing includes a secondary cool air conduit forming the secondary cool air pathway, a secondary warm air conduit forming the secondary warm air pathway and a secondary mixing chamber.

2. The air-handling system of claim 1, wherein the secondary cool air pathway branches from the primary flow path at a position upstream of a division of the primary flow path into the primary cool air pathway and the primary warm air pathway.

3. The air-handling system of claim 1, wherein an inlet end of the secondary cool air conduit abuts a downstream side of the evaporator core.

4. The air-handling system of claim 1, wherein the secondary cool air conduit divides the primary cool air pathway into a first primary cool air pathway and a second primary cool air pathway.

5. The air-handling system of claim 1, wherein the primary flow path is defined by cooperation of an interior surface of the primary zone housing and an exterior surface of the secondary zone housing and the secondary flow path is defined by an interior surface of the secondary zone housing.

6. The air-handling system of claim 1, wherein an inlet end of the secondary warm air conduit is disposed immediately downstream of the heater core.

7. The air-handling system of claim 1, wherein a primary temperature control door is disposed at a downstream end of each of the primary cool air pathway and the primary warm air pathway, the primary temperature control door configured to control a distribution of the flow of the air between the primary cool air pathway and the primary warm air pathway.

8. The air-handling system of claim 7, wherein a secondary temperature control door is disposed at a downstream end of each of the secondary cool air pathway and the secondary warm air pathway, the secondary temperature control door configured to control a distribution of the flow of the air between the secondary cool air pathway and the secondary warm air pathway.

9. The air-handling system of claim 1, wherein a wall segment forms a division of the primary flow path into the primary cool air path and the primary warm air path.

10. The air-handling system of claim 9, wherein the primary cool air pathway and the secondary cool air pathway are each disposed to a first side of the wall segment while the primary warm air pathway is disposed to a second side of the wall segment.

11. The air-handling system of claim 1, wherein the primary flow path includes a primary mixing section disposed downstream of each of the primary cool air pathway and the primary warm air pathway, wherein the secondary cool air pathway is disposed between the primary mixing section and the primary warm air pathway.

12. The air-handling system of claim 1, wherein the primary warm air pathway is disposed along a peripheral portion of the air-handling casing.

13. The air-handling system of claim 1, wherein the secondary cool air pathway is routed through the primary warm air pathway of the primary flow path at a position upstream of the heater core.

14. An air-handling system for a vehicle comprising:
an evaporator core disposed in an air-handling casing configured to receive a flow of air therethrough;
a heater core disposed in the air-handling casing at a position downstream of the evaporator core with respect to the flow of the air;
a primary flow path and a secondary flow path each formed within the air-handling casing, the primary flow path leading to a primary zone of a passenger compartment of the vehicle and the secondary flow path leading to a secondary zone of the passenger compartment of the vehicle, the primary flow path divided into a first primary flow path and a second primary flow path downstream of the evaporator core, the first primary flow path divided into a first primary cool air pathway receiving air bypassing the heater core and a first primary warm air pathway receiving air passing through the heater core, the second primary flow path divided into a second primary cool air pathway receiving air bypassing the heater core and a second primary warm air pathway receiving air passing through the heater core, and the secondary flow path including a secondary cool air pathway branching from the primary flow path downstream of the evaporator core and a secondary warm air pathway branching from the primary flow path downstream of the heater core, the secondary cool air pathway receiving air bypassing the heater core and the secondary warm air pathway receiving air passing through the heater core, wherein the air-handling casing is formed by cooperation of a primary zone housing and a secondary zone housing, a part of which is accommodated in the primary zone housing, and the secondary zone housing includes a secondary cool air conduit forming the secondary cool air pathway, a secondary warm air conduit forming the secondary warm air pathway and a secondary mixing chamber.

15. The air-handling system of claim 14, wherein the primary flow path is defined by cooperation of an interior surface of the primary zone housing and an exterior surface of the secondary zone housing and the secondary flow path is defined by an interior surface of the secondary zone housing.

16. The air-handling system of claim 15, wherein the secondary zone housing forms a division of the primary flow path into the first primary flow path and the second primary flow path.

17. The air-handling system of claim 15, wherein an inlet end of the secondary cool air conduit is disposed downstream of the evaporator core and upstream of each of a division of the first primary flow path into the first primary cool air pathway and the first primary warm air pathway and a division of the second primary flow path into the second primary cool air pathway and the second primary warm air pathway.

* * * * *